(12) United States Patent
Murata (10) Patent No.: US 7,067,735 B2
(45) Date of Patent: Jun. 27, 2006

(54) ELECTRONIC DEVICE WITH IMPACT ABSORBING STRUCTURE

(75) Inventor: Susumu Murata, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/919,439

(22) Filed: Aug. 17, 2004

(65) Prior Publication Data

US 2005/0056444 A1  Mar. 17, 2005

(30) Foreign Application Priority Data

Sep. 12, 2003  (JP)  .............................. 2003-321596

(51) Int. Cl.
H02G 3/08 (2006.01)
(52) U.S. Cl. .................. 174/50; 174/66; 174/52.1; 174/56; 361/747; 361/726; 361/759; 220/241; 220/3.8
(58) Field of Classification Search ................. 174/50, 174/66, 52.1, 56; 361/747, 726, 759; 220/241, 220/3.8
See application file for complete search history.

(56) References Cited

U.S. PATENT DOCUMENTS

| 4,409,467 | A | 10/1983 | Honjo |
| 4,524,242 | A | 6/1985 | Fish, III et al. |
| 5,368,159 | A | 11/1994 | Doria |
| 5,408,044 | A * | 4/1995 | Spiegel ............... 174/52.1 |
| 5,758,980 | A | 6/1998 | Takenaka |
| 5,955,700 | A | 9/1999 | Slipy et al. |
| 5,955,868 | A | 9/1999 | Kaite et al. |
| 6,676,314 | B1 | 1/2004 | Tanaka et al. |
| 2003/0031494 | A1 | 2/2003 | Cockerill et al. |

FOREIGN PATENT DOCUMENTS

| EP | 1 205 953 A2 | 5/2002 |
| EP | 1 205 953 A3 | 5/2002 |
| JP | A 9-254450 | 9/1997 |
| JP | A 11-240209 | 9/1999 |
| JP | A 2000-232271 | 8/2000 |
| JP | A 2001-102767 | 4/2001 |
| JP | A 2001-301272 | 10/2001 |
| JP | A 2003-63071 | 3/2003 |
| WO | WO 95/14366 | 5/1995 |

* cited by examiner

Primary Examiner—Dean A. Reichard
Assistant Examiner—Anton B. Harris
(74) Attorney, Agent, or Firm—Oliff & Berridge, PLC (57) ABSTRACT

An electronic apparatus including an outer wall section of the electronic apparatus and an inner wall section that is provided inside the outer wall section and includes a battery accommodating section that can accommodate at least one battery, wherein the outer wall section and the inner wall section are thin plate members integrally formed so as to be flexibly deformed under an external force, and a specified gap is formed between the outer wall section and the inner wall section.

22 Claims, 11 Drawing Sheets

ELECTRONIC DEVICE WITH IMPACT ABSORBING STRUCTURE

CROSS-REFERENCE TO RELATED APPLICATION

This application claims priority from JP 2003-321596, filed Sep. 12, 2003, the disclosure of which is incorporated in its entirety herein by reference thereto.

BACKGROUND OF THE INVENTION

1. Field of Invention

The present invention relates to a tape printing apparatus having an apparatus main body and a battery accommodating section which accommodates at least one battery inside.

2. Description of Related Art

In the related art, there are portable tape printing apparatuses that accommodate a tape cassette containing a tape, include a platen roller driven by a drive motor and incorporate batteries therein so as to print the tape through a printing means and discharge the tape outside of the tape printing apparatus.

For example, Japanese Patent Application Laid-Open Publication No. HEI9-254450 (page 3, FIGS. 1–3) discloses a tape printing apparatus in which a control board and a tape cassette are disposed in a case such that the control board and the tape cassette overlap vertically with a space there between, a cutout section is formed at an end in a length direction of the control board, a drive motor is disposed at a side in the cutout section, and a power circuit and a plurality of batteries are accommodated, in positions where the lengths of the batteries parallel, on an opposite side to the side in which the drive motor is disposed in the tape printing apparatus.

In this tape printing apparatus, forming a space between the tape cassette and the battery accommodating section is unnecessary. As a result, the length of the control board or increasing the size of the case is reduced so the tape printing apparatus can be formed shorter and more compact. Further, the drive motor can be disposed on one side in the length direction of a wide section of the case and the battery accommodating section can be provided on the other side so that the drive motor and battery, which are both heavy components, are disposed on both sides of the case. As a result, a weight of the case is not concentrated to one side when an input operation is carried out as the case is held by an operator, thereby improving the operability. If the liquid crystal display is positioned to one side of a short side of the wide section of the control board and the cutout section in which the drive motor is disposed is located at a side of the liquid crystal display, the dimension in the length direction of the control board can be shorter. As a result, a dimension in the length direction of the tape printing apparatus becomes shorter, thereby the entire size of the tape printing apparatus can be made more compact.

SUMMARY OF THE INVENTION

Although the tape printing apparatus described above is portable, the tape printing apparatus has no structure that protects the tape printing apparatus from damage which may occur if the tape printing apparatus is accidentally dropped on the ground, floor or other surface. If an electronic apparatus such as a tape printing apparatus having a battery accommodating section which accommodates batteries accidentally drops on the ground, the battery accommodating section, which is heavier than other sections of the tape printing apparatus, drops first and may cause a sheath of the tape printing apparatus and inside devices to be damaged due to an impact created when the tape printing apparatus hits the ground, floor or other surface. Additionally, a terminal plate section provided inside the battery accommodating section is also likely to be damaged easily. Therefore, a portable tape printing apparatus that possesses a protective structure that protects the tape printing apparatus from damage resulting from an impact due to the drop is desired.

One object of the present invention is to provide an electronic apparatus in which the outer wall section thereof is covered with protector members and a gap is formed between an inner wall section forming a battery accommodating section and the outer wall section, so that when the electronic apparatus accidentally drops, a force created upon impact is absorbed by the protector members and the outer wall section is elastically deformed inwardly to absorb the impact of the drop, thereby protecting the electronic apparatus from being damaged.

To achieve the above and/or other objects, according to an exemplary aspect of the present invention, there is provided an electronic apparatus having an outer wall section of the electronic apparatus and an inner wall section that is provided inside the outer wall section and includes a battery accommodating section that can accommodate at least one battery, wherein the outer wall section and the inner wall section are thin plate members formed integrally so as to be flexibly deformed against an external force, and a specified gap is formed between the outer wall section and the inner wall section.

According to this structure, when the electronic apparatus accidentally drops, the outer wall section, which contacts the ground, floor or other surface upon impact, is elastically deformed inwardly to absorb an impact of the drop. Therefore, a sheath and inside devices of the electronic apparatus are protected from damage that may result from an impact of the drop.

BRIEF DESCRIPTION OF THE DRAWINGS

Objects, features and advantages of the invention will become more apparent from reading the following description of exemplary embodiments taken in connection with the accompanying drawings in which.

DETAILED DESCRIPTION OF PREFERRED EMBODIMENTS

Figure 1:
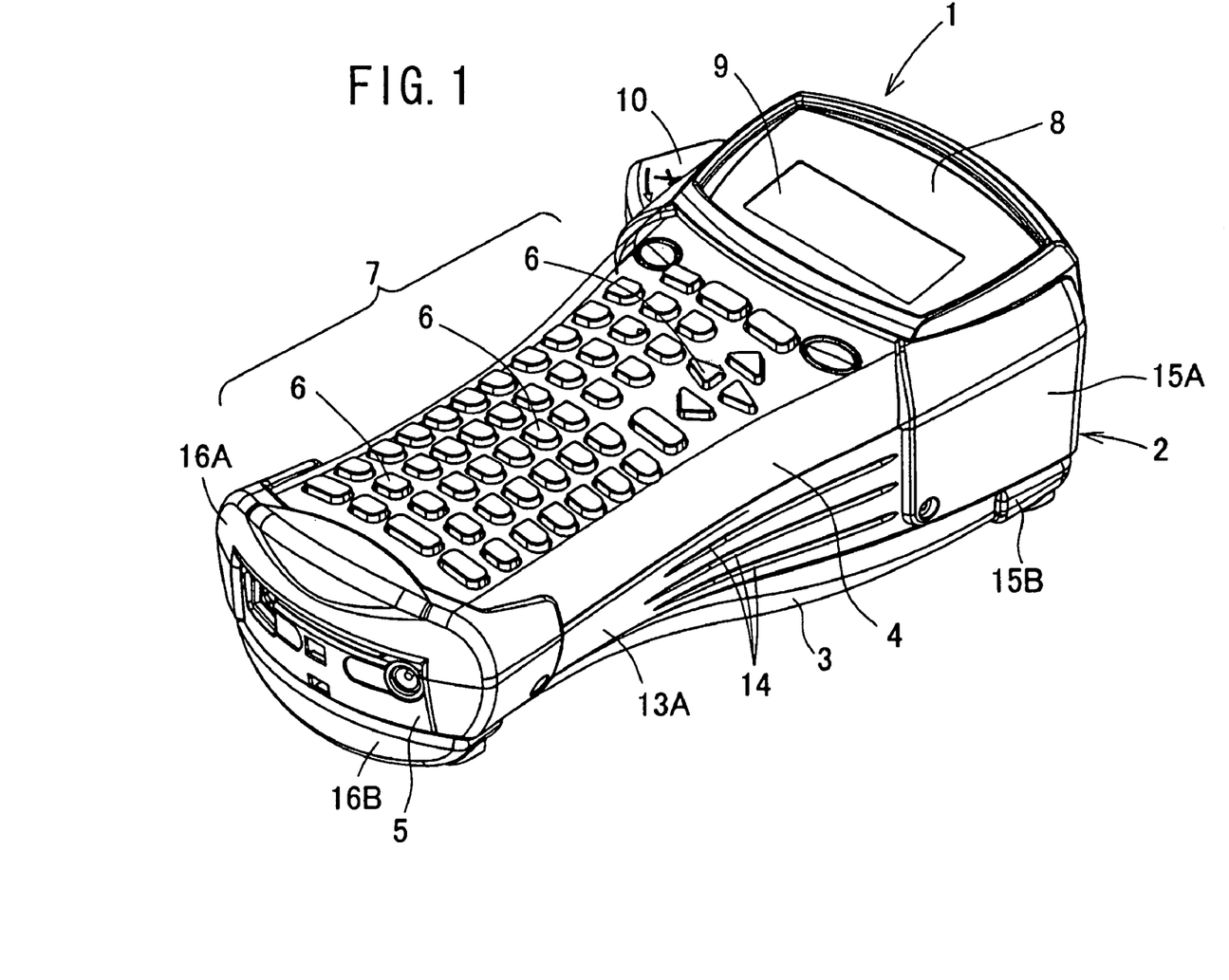
FIG. 1 is a perspective view of a tape printing apparatus according to an exemplary embodiment of an exemplary embodiment of the invention.

Exemplary embodiments of tape printing apparatus, which is an exemplary embodiment of the electronic apparatus of the invention, will be described in detail with reference to the accompanying drawings. First, a schematic structure of the tape printing apparatus of this embodiment will be described with reference to FIGS. 1 and 2. FIG. 1 is a perspective view of an entire tape printing apparatus and FIG. 2 is a perspective view of the rear side of the tape printing apparatus.

Figure 2:
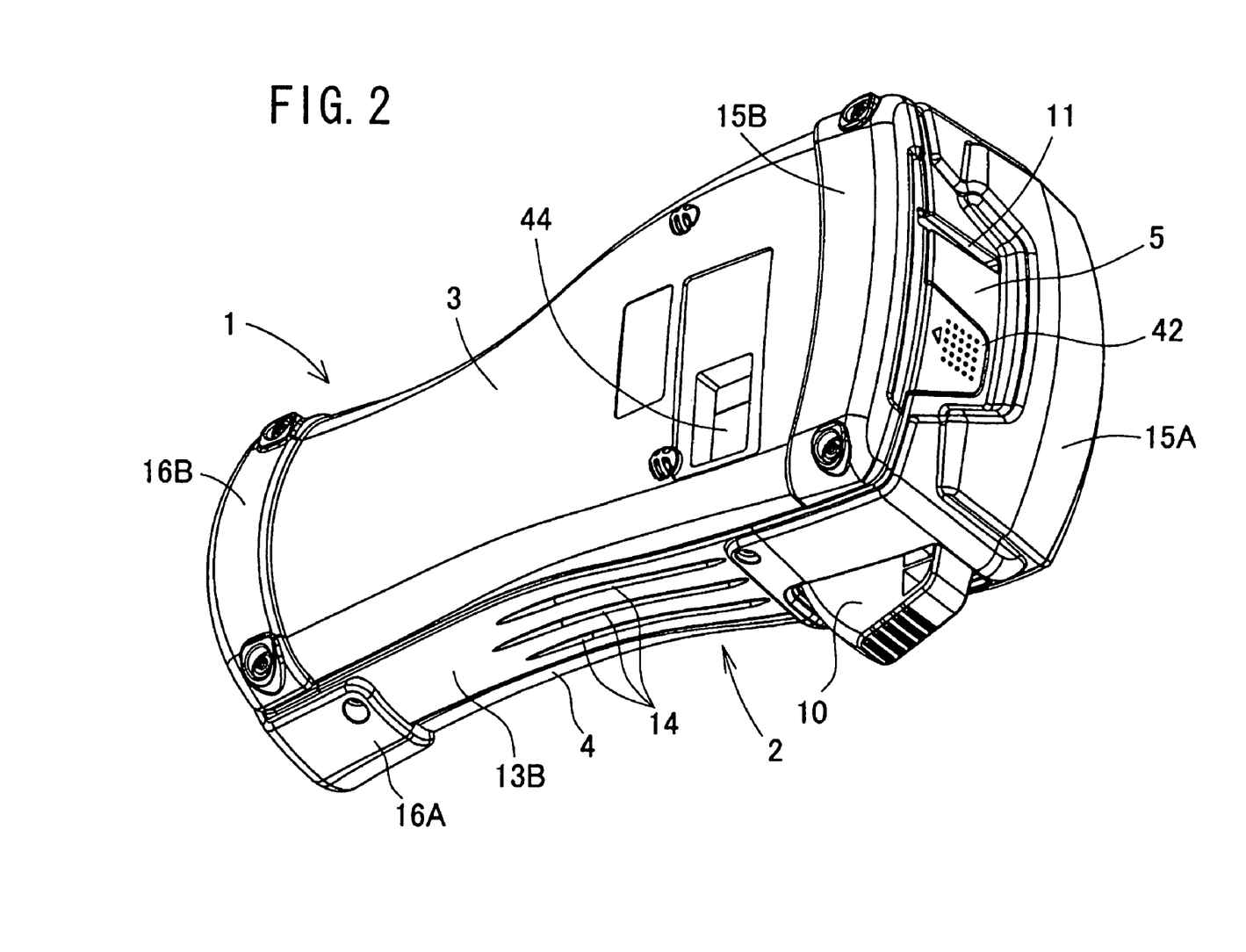
FIG. 2 is a perspective view of the rear side of the tape printing apparatus according to the exemplary embodiment of the invention.

As shown in FIGS. 1 and 2, the tape printing apparatus 1 includes a main body 2 made of any suitable material such as polystyrene and a rear cover 3 made of any suitable material such as polystyrene mounted detachably so as to cover the entire rear face, which is a face opposite to a top face surface opposing the user when the tape printing apparatus 1 is used, of the main body 2. The main body 2 includes an upper unit 4 and a lower unit 5. The upper unit 4 has a key arrangement section 7 in which various kinds of keys 6 such as character keys for inputting characters, print key that execute print and the like are disposed on the top face surface of the upper unit 4. The upper unit 4 also includes an elongated window section 8 disposed substantially centrally in the right/left direction of the top face surface located at an end section of the tape printing apparatus 1. A liquid crystal display 9 is disposed in this window section 8 to display characters and the like inputted through the keys 6.

A cutter lever 10 is provided on the left side face of the liquid crystal display 9 of the main body 2. By pressing this cutter lever 10 inward, a tape 12 (see FIG. 3) discharged from a tape discharge slot 11 formed at a top end section of the main body 2 can be cut out with a cutter (not shown). The tape 12 includes an image receiving layer on which characters are printed, an adhesive layer and a separator that covers the surface of the adhesive layer.

The lateral width of the upper unit 4 having the key arrangement section 7 is smaller than the lateral width of the end section having the window section 8. Grip members 13A, 13B are attached to both sides of the lower unit 5. The grip members 13A, 13B which are formed of any suitable elastic material such as a styrene based elastomer resin and cover the lower unit 5 to protect the tape printing apparatus 1 from impact. Because the grip members 13A, 13B are mounted on the same plane as the main body 2 and the rear cover 3 as will be described later, removal of an end section of the grip members 13A, 13B is less likely. Further, the grip members 13A, 13B each include three parallel rows of protrusions 14 formed on a surface of the grip members 13A, 13B to help reduce or prevent slippage that may occur when the tape printing apparatus 1 is held by the user.

A method for mounting the grip members 13A, 13B to the tape printing apparatus 1 will be described later.

The tape printing apparatus 1 has first protector members 15A, 15B that cover the end section provided with a liquid crystal display 9 and second protector members 16A, 16B, which is formed separately from the first protector members 15A, 15B, that cover the end section on an opposite side to the end section provided with the liquid crystal display 9. The respective first and second protector members 15A, 15B, 16A, 16B are separate elements located on the upper unit 4, the lower unit 5 and the rear cover 3. The first protector member 15A and the second protector member 16A are attached to the upper unit 4 and the lower unit 5, while the first protector member 15B and the second protector member 16B are attached to the rear cover 3.

Further, because the first and second protector members 15A, 15B, 16A, 16B are formed of any suitable material such as styrene based elastomer resin having elasticity like the aforementioned grip member 13, the first and second protector members 15A, 15B, 16A, 16B absorb an impact force which is created when the tape printing apparatus 1 is dropped, thereby protecting the exterior face of the tape printing apparatus 1 from damage.

A method for mounting the first and second protector members 15A, 15B, 16A, 16B onto the tape printing apparatus 1 will be described later.

Figure 3:
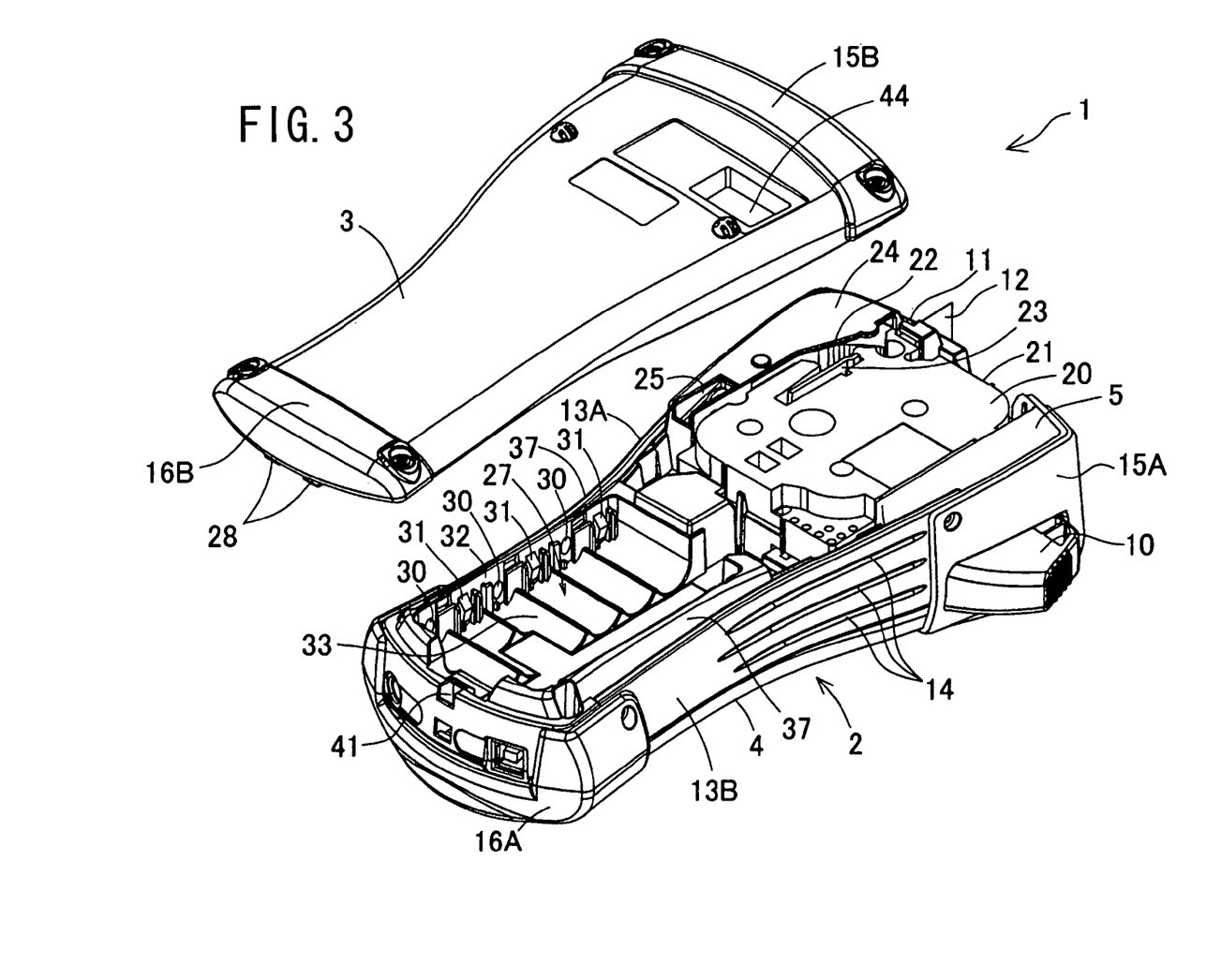
FIG. 3 is a perspective view of an interior of a lower unit of a main body of the tape printing apparatus of the exemplary embodiment.
Figure 4:
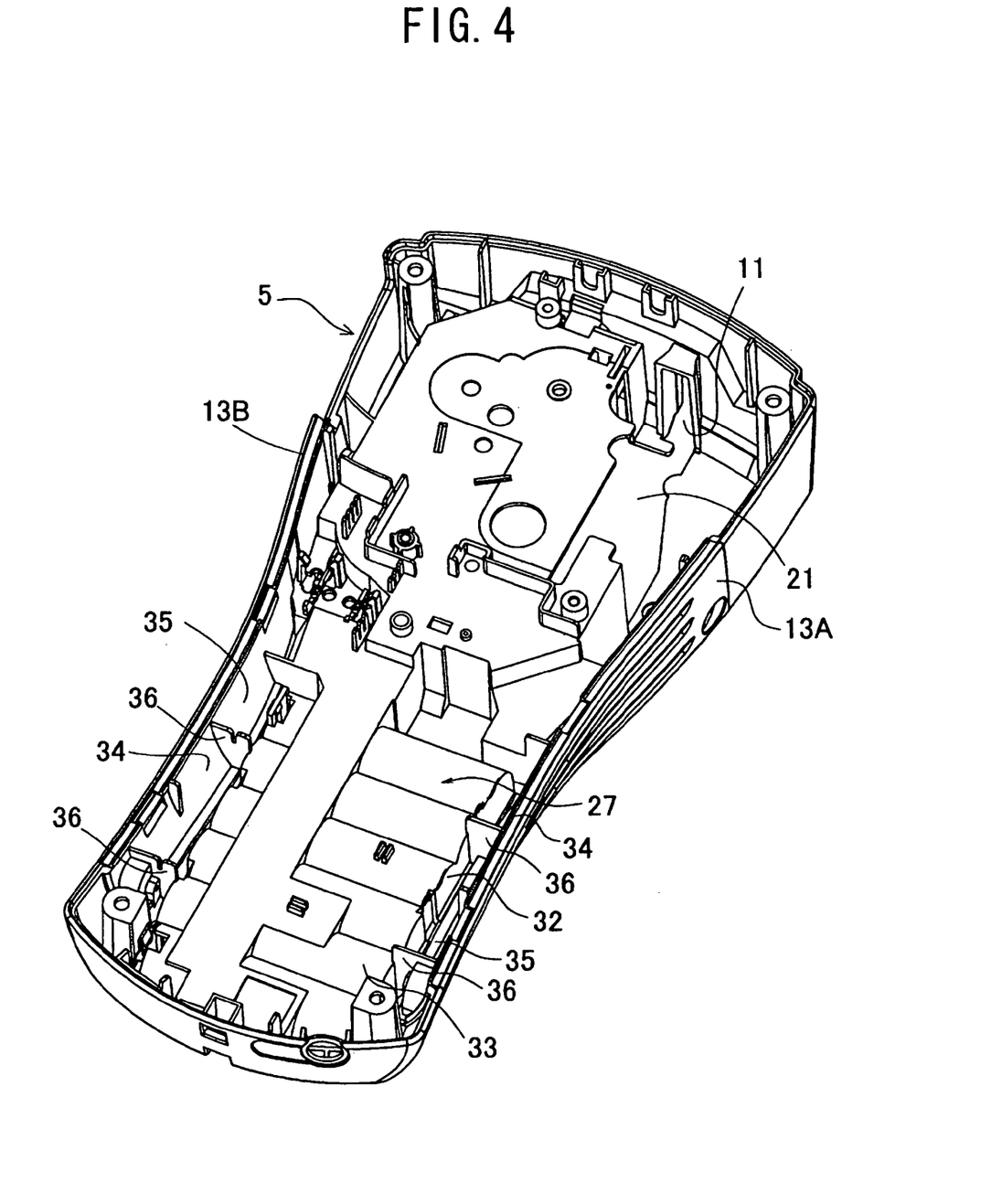
FIG. 4 is a perspective view indicating the lower unit of the main body of the tape printing apparatus of the exemplary embodiment.

Next, an interior structure of the lower unit 5 will be described with reference to FIGS. 3 and 4. FIG. 3 is a perspective view showing the tape printing apparatus when the rear cover is detached as viewed from the rear side. FIG. 4 is a perspective view of the lower unit 5 as seen from the front face thereof.

As shown in FIGS. 3 and 4, the lower unit 5 is provided with a cassette accommodating section 21 which is substantially rectangular and has a depth equal to a thickness of a tape cassettes 20 to accommodate the external shape of the tape cassette 20. In the vicinity of the end section on the cutter lever 10 side of the cassette accommodating section 21, a thin thermal head mounting section 23, on which a thermal head 22 is to be mounted, is provided at a right angle along the length direction of the tape printing apparatus 1. Further, a platen holder (not shown) is rotatably provided at a drive section 24 located in a side portion of the cassette accommodating section 21 opposing the thermal head 22.

When the rear cover 3 is attached to the bottom face of the lower unit 5, a platen holder release lever (not shown) is pressed in by a protruded section 26 (see FIG. 7) provided on an inside face of the rear cover 3. As a result, the platen holder is rotated to the side of the tape cassette 20 up to a position where part of the tape 12 in the tape cassette 20 is pressed against the thermal head 22 and then fixed thereto. Subsequently, the tape 12, which is printed through the thermal head 22, is carried by a tape carrying mechanism (not shown) containing a drive motor and discharged through the tape discharge slot 11.

A battery accommodating section 27, which accommodates a plurality of batteries 28 in a parallel arrangement, is formed opposite to the side provided with the cassette accommodating section 21 in the lower unit 5 such that they protrude toward the rear face with respect to the bottom face of the cassette accommodating section 21.

Figure 5:
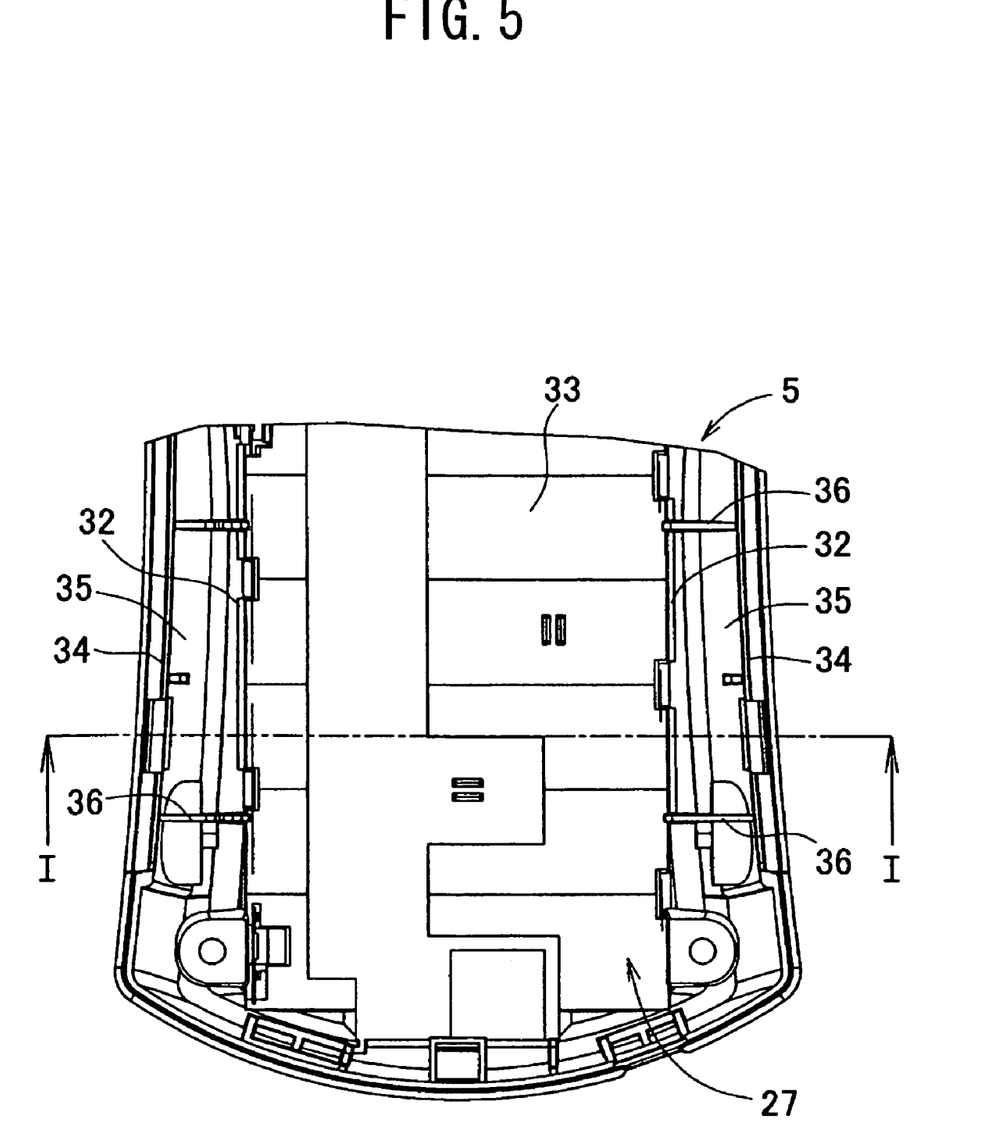
FIG. 5 is a plan view of a battery accommodating section located in the lower unit of the main body of the exemplary embodiment.
Figure 6:
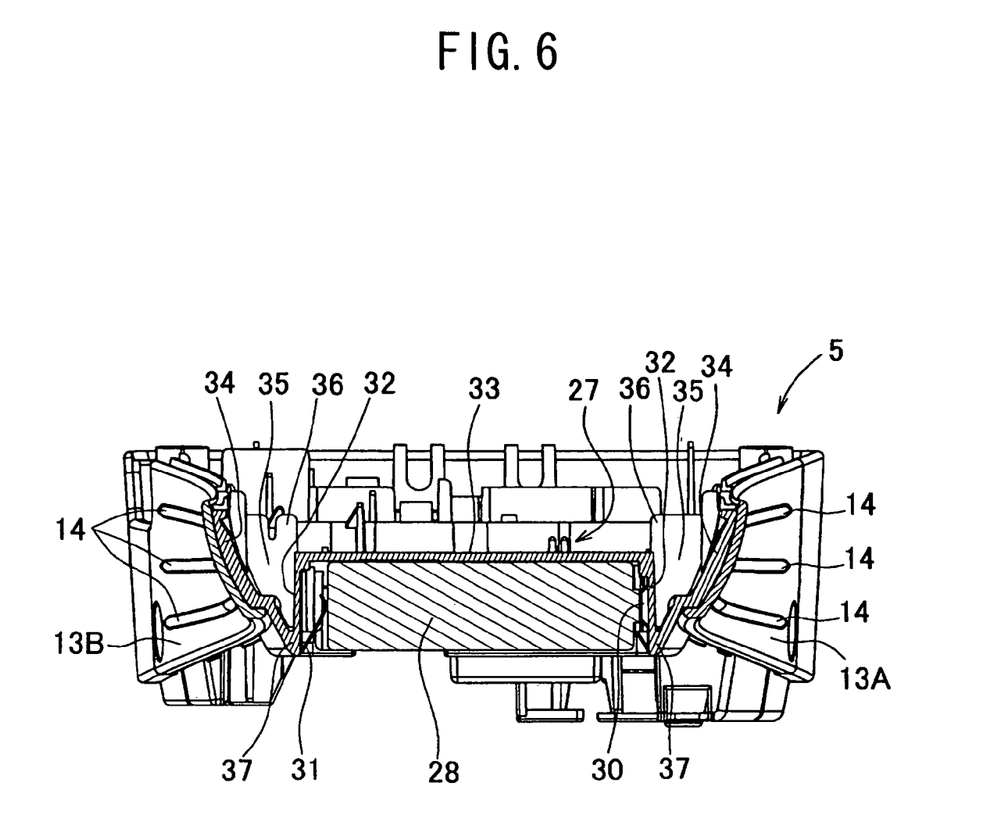
FIG. 6 is a sectional view of the lower unit of the main body taken along the line I—I of FIG. 5.

The lower unit 5, particularly, structures surrounding the battery accommodating section 27 will be described with reference to FIGS. 5 and 6. FIG. 5 is a plan view of the lower unit of main body, particularly, the surrounding of the battery accommodating section according to this embodiment. FIG. 6 is a sectional view of the lower unit 5 taken along the line I—I in FIG. 5.

The battery accommodating section 27 includes an accommodating section bottom wall 33 and accommodating section side walls 32 each having a positive electrode terminal plate 30 (see FIG. 3) and a negative electrode terminal plate 31 (see FIG. 3) Each terminal of a battery 28 (see FIG. 11) contacts both the positive electrode terminal plate 30 and the negative electrode terminal plate 31 when the battery 28 is accommodated in the battery accommodating section 27. A specific gap 35 including a substantially v-shaped cross-section is formed between the accommodating section side wall 32 and a side wall section 34, which is an outside wall of the lower unit 5 and thin ribs 36 are provided in the gap 35 to connect the accommodating side wall 32 with the side wall section 34.

The battery accommodating section side wall 32, the accommodating section bottom wall 33 and the side wall section 34 are formed in the form of a single integrated thin plate in which the battery accommodating section side wall 32 and the side wall section 34 are disposed to oppose each other through a curved section 37 (see FIG. 3) located there between.

The positive electrode terminal plate 30 and the negative electrode terminal plate 31 are formed of stainless steel or other conductive material, and supply a driving section of the tape printing apparatus with electric power created by contacting the positive and the negative electrode terminals of the battery 28, respectively. When the battery 28 is not accommodated in the battery accommodating section 27, a distance between the respective positive and negative terminal plates 30, 31 is less than the length of the battery 28 in order to place the positive electrode terminal plate 30 and the negative electrode terminal plate 31 in positions that provide a secure contact with the terminal sections of the battery 28. As shown in FIG. 6, the negative electrode terminal plate 31 is formed in a substantially V-shaped form. When the battery 28 is accommodated in the battery accommodating section 27, the negative electrode terminal plate 31 is pushed by the negative terminal of the battery 28 and deformed toward the outside (leftward in FIG. 6), and the positive and negative electrode terminal plates 30, 31 are brought into a secure contact with the respective terminals of the battery 28.

The thin ribs 36 join the side wall section 34 of the lower unit 5 and the battery accommodating section side wall 32 to eliminate molding distortion when the lower unit 5 is formed and when the tape printing apparatus 1 is held by an operator. The thin ribs 36 act as a reinforcement members that prevent the side wall section 34 from being distorted inward. On the other hand, if a strong load or external force is applied to the side wall section 34, such as an impact force created when the tape printing apparatus 1 is accidentally dropped, the ribs 36 are also deformed. Because the side wall section 34 is deformed inward towards the curved section 37, which acts as a fulcrum point, accompanied by the deformation of the ribs 36, an impact force created by the drop can be absorbed (see FIG. 1). A mechanism for absorbing the impact of the side wall section 34 will be described later.

When the rear cover 3 is attached to the bottom of the lower unit 5, first insertion sections 40 formed at an end on the side in which the second protector member 16B is provided are inserted into an insertion grooves 41 in the lower unit 5 and after that, a pawl section 43 (see FIG. 7) with respect to the second insertion section 42 provided on a opposite side to the first insertion section 40 is engaged with a pawl fixing section (not shown) provided on the lower unit 5, so that the rear cover 3 is attached. If the second insertion section 42 is pressed towards the inside of the tape printing apparatus 1 when the rear cover 3 is attached, the pawl section 43 is released from the pawl fixing section, so that the rear cover 3 can be easily attached to and detached from the lower unit 5. When the rear cover 3 is removed, the tape cassette 20 can be removed form of the cassette accommodating section 21. The rear cover 3 allows the batteries 28 accommodated in the battery accommodating section 27 to be taken out successively and replaced. Also, the rear cover 3 can be opened and closed with the respective protector members 15A, 15B, 16A, 16B mounted on the tape printing apparatus 1 because the first and second protector members 15A, 15B, 16A, 16B are separately provide on the upper unit 4, the lower unit 5 and the rear cover 3 as described above.

A check window 44 is provided in a section of the rear cover 3 opposing to the tape cassette 20 accommodated in the lower unit 5, and the first protector member 15B is attached to the rear cover 3 without covering the check window 44. Therefore, the type of the tape cassette 20 accommodated in the cassette accommodating section 21 can be viewed through the check window 44 without opening the rear cover 3.

As shown in FIG. 2, the first protector member 15A located at a section covering a top face on the side of the liquid crystal display 9 of the tape printing apparatus 1 is cut out so as not to cover the tape discharge slot 11 and the second insertion section 42 of the rear cover 3. Consequently, the first protector member 15A never obstructs discharge of the tape 12 when the first protector member 15A is mounted on the side of the liquid display 9. Further, when the rear cover 3 is removed from the lower unit 5, the operation of pressing the second insertion section 42 towards the inside of the tape printing apparatus 1 is never obstructed. Therefore, a printed tape 12 can be discharged from the tape discharge slot 11 when the first protector member 15A is mounted. Further, the rear cover 3 can be removed from the lower unit 5 by pressing the second insertion section 42 towards the inside of the apparatus.

When the first protector member 15A is installed on the upper unit 4 and the lower unit 5, a surface of the second insertion section 42 is positioned lower than a surface of the first protector member 15A. As a result, if the tape printing apparatus 1 drops on the ground, the second insertion section 42 will likely not be pressed in to allow the rear cover 3 to be removed because the first protector member 15A makes a contact with the ground or the like earlier than the second insertion section 42.

Figure 7:
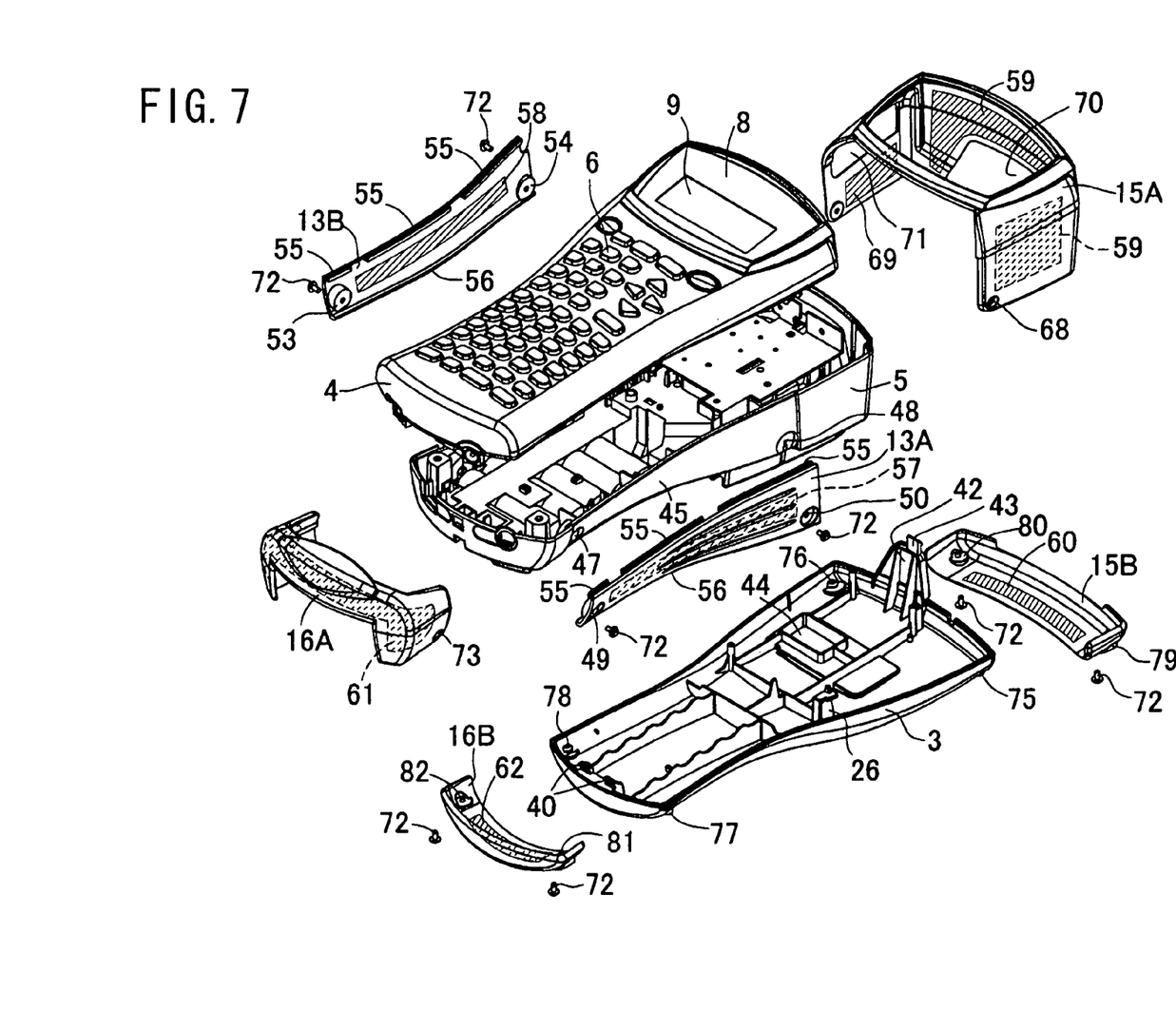
FIG. 7 is an explanatory diagram showing the method for attaching a protector member and a grip member of the tape printing apparatus of the exemplary embodiment.
Figure 8:
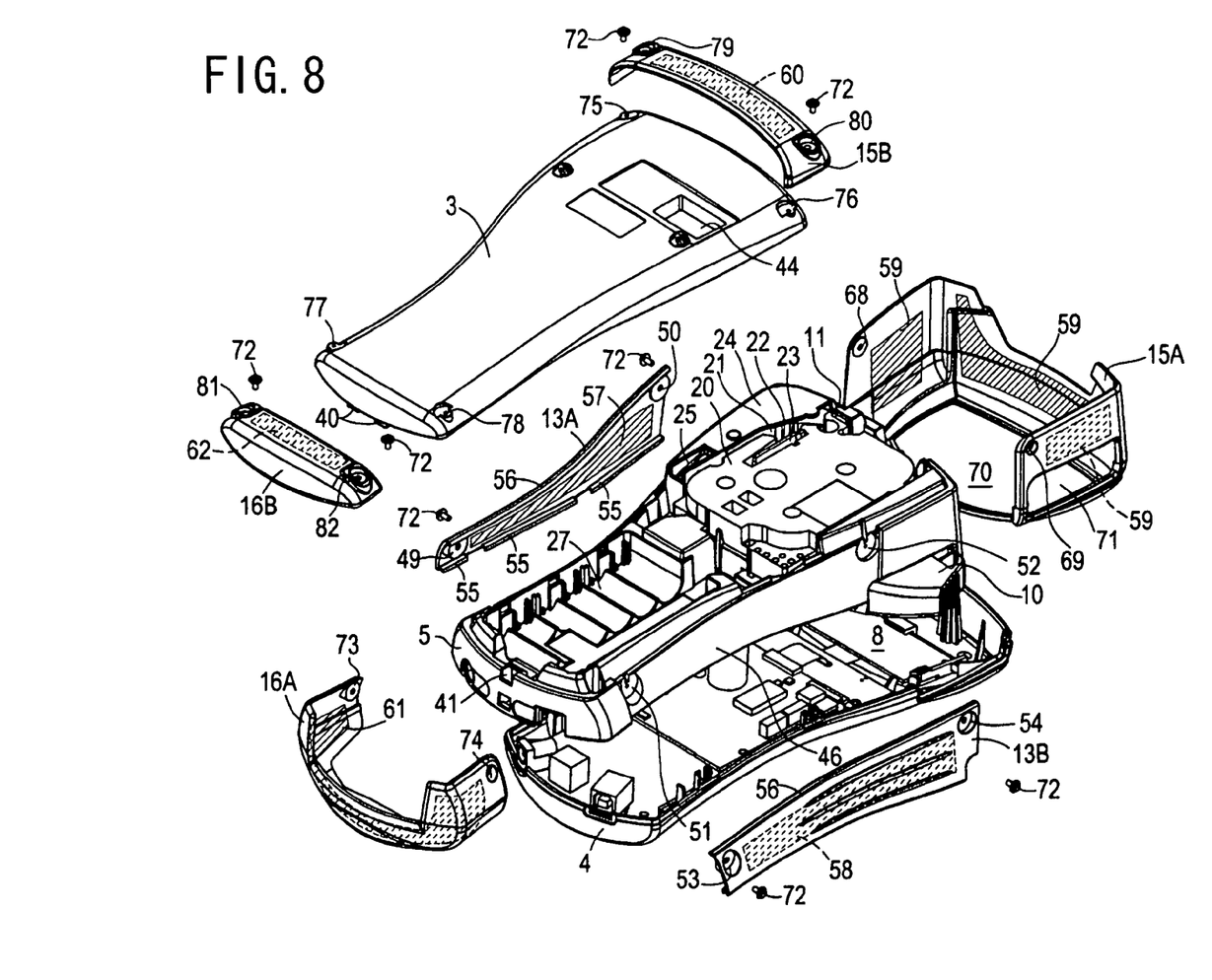
FIG. 8 is an explanatory diagram showing the method for attaching the protector member and grip member of the rear side of the tape printing apparatus of the exemplary embodiment.
Figure 9:
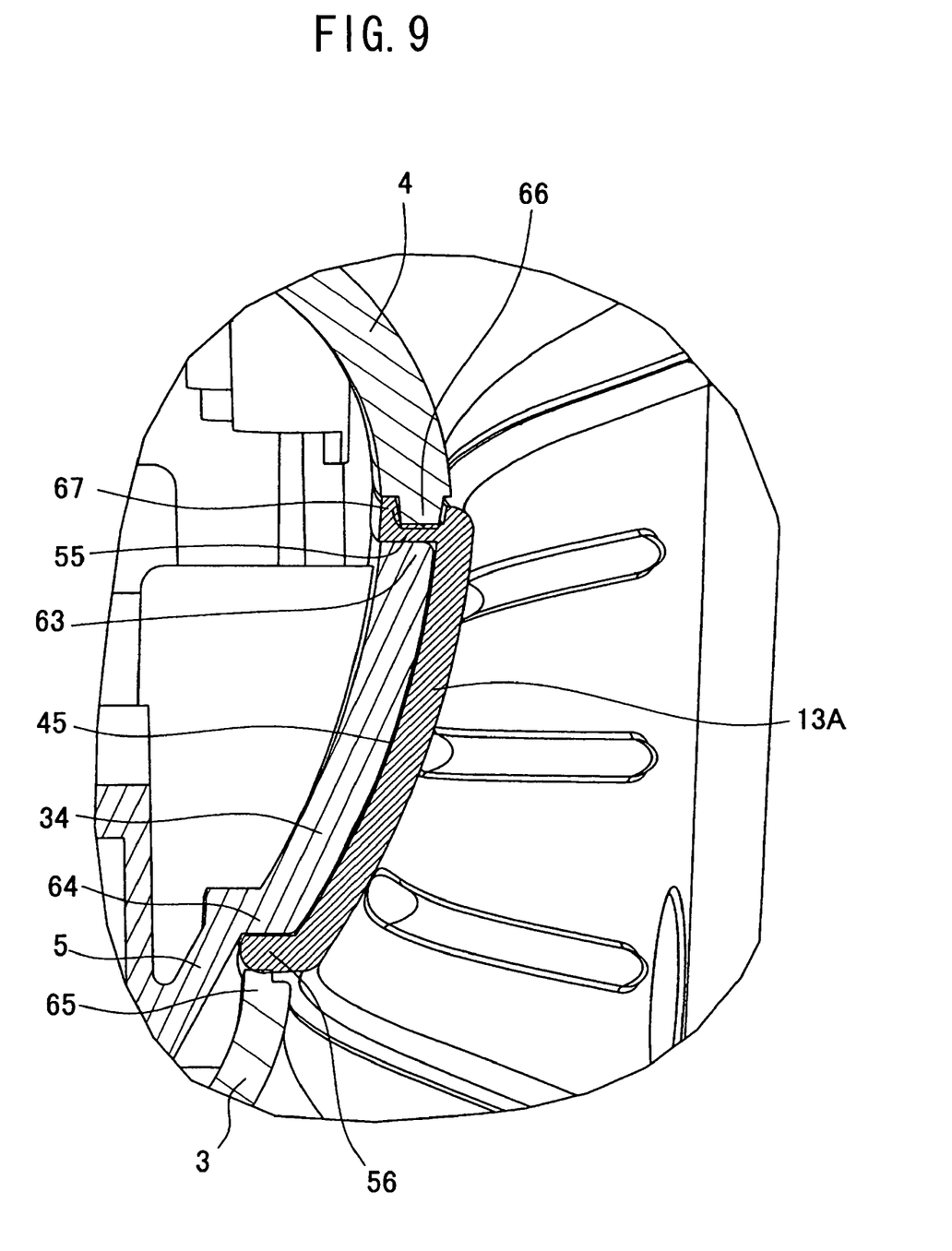
FIG. 9 is a sectional view of the grip member attached to the tape printing apparatus of the exemplary embodiment.

Next, a method for mounting the grip members 13A, 13B, the first protector members 15A, 15B and the second protector members 16A, 16B on the tape printing apparatus 1 will be described with reference to FIGS. 7–9. FIG. 7 is an explanatory diagram showing the method for mounting the grip members 13A, 13B, the first protector members 15A, 15B and the second protector members 16A, 16B on the tape printing apparatus 1 as viewed from the front side thereof. FIG. 8 is an explanatory diagram showing the method for mounting the grip members 13A, 13B, the first protector members 15A, 15B and the second protector members 16A, 16B onto the tape printing apparatus 1 as viewed from the rear side thereof. FIG. 9 is a sectional view of the grip member 13A attached to the tape printing apparatus 1.

Concave attachment sections 45, 46 that attach the grip members 13A, 13B are provided on both sides of the tape printing apparatus 1 to extend from the cassette accommodating section 21 of the lower unit 5 up to the battery accommodating section 27 in the tape printing apparatus 1.

The attachment sections 45, 46 are formed in such a depth and size that allow outer surfaces of the grip members 13A, 13B to form a same plane continuous to outer surfaces of the lower unit 5 and the upper unit 4 located around the grip members 13A, 13B when the grip members 13A, 13B are attached. First engagement sections 47, 48 in which a hole is formed in the center thereof are provided on both ends of the attachment section 45. On the other hand, second engagement sections 49, 50 in which a hole is formed in the center thereof are provided at positions in the grip members 13A, 13B corresponding to the first engagement sections 47, 48 of the attachment section 45. The first engagement sections 51, 52, which are equal to the aforementioned first engagement sections 47, 48, are provided in the attachment section 46 while the second engagement sections 53, 54, which are equal to the second engagement sections 49, 50, are provided in the grip member 13B. First engagement pieces 55 are formed in the center and at both ends along a top edge of an inside face of the grip members 13A, 13B and second engagement pieces 56 are formed along a bottom edge of the inside face of the grip members 13A, 13B along ends thereof.

When the grip member 13A is attached to the tape printing apparatus 1, first, a double-sided adhesive tape 57 or other adhesive is bonded to the inside face of the grip member 13A to bond the grip member 13A to the attachment section 45 with the double-sided adhesive tape 57. By engaging the first engagement sections 47, 48 with the second engagement sections 49, 50, the grip member 13A can be positioned easily. The double-sided adhesive tapes 57, 58, 59, 60, 61 and 62 used in this exemplary embodiment use removable type adhesive agent, so that they can be peeled off easily without any adhesive agent left on the bonding surface even after a long-time usage.

When the grip member 13A is bonded to the attachment section 45 with the double-sided adhesive tape 57, the first engagement pieces 55 formed on a top edge if the inside face of the grip member 13A keeps a contact with a top edge 63 (see FIG. 9) of the lower unit 5 formed in the attachment section 45 (see FIG. 9). After the grip member 13A is attached to the attachment section 45 with double-sided adhesive tape 57, when the upper unit of main body 4 is mounted on the lower unit of main body 5, the first engagement pieces 55 are nipped and fixed by a bottom edge 66 of the upper unit 4 and an upper edge 63 of the lower unit 5. The second engagement piece 56 formed on the bottom of the grip member is kept in contact with a step 64 of the lower unit 5 formed on the attachment section 45. Thus, when the rear cover 3 is attached to the lower unit 5 after the grip member 13A is bonded thereto, the second engagement piece 56 is nipped and fixed by the step 64 of the lower unit 5 and an upper edge 65 of the rear cover 3.

When the first engagement pieces 55 are nipped by the bottom edge 66 of the upper unit 4 and the upper edge 63 of the lower unit 5, an engagement pawl 67 provided at a front end of the first engagement piece 55 makes a contact with an inside face of the bottom edge 66 of the upper unit 4, so that the first engagement piece 55 is fixed more securely.

Consequently, the grip member 13A is attached to the tape printing apparatus 1. The grip member 13B has basically the same structure as the grip member 13A and is attached to the tape printing apparatus 1 in the same way as described above. Therefore, description of that matter is omitted.

Although as described previously, the rear cover 3 is mounted detachably to the lower unit 5 for replacement of the tape cassette 20 or the battery 28, usually, the user does not need to remove the upper unit 4 from the lower unit 5.

Thus, even when the rear cover 3 is removed at the time of normal usage, the top sections of the grip members 13A, 13B are always nipped and fixed as discussed above. Therefore, when the rear cover 3 is removed, the grip members 13A, 13B do not get loose from the attachment sections 45, 46. Further, because by forming the attachment sections 45, 46 are in a concave configuration, the grip members 13A, 13B, the main body 2 and the rear cover 3 form the same continuous plane to reduce the likelihood that the grip members 13A, 13B may become disengaged when the tape printing apparatus 1 is held by a user.

A method for mounting the first protector member 15A and the second protector member 16A to the tape printing apparatus 1 will be described below. Third engagement sections 68, 69 having a hole in the center are provided at two positions on both sides of corners of the first protector member 15A. By forming cutout sections 70, 71 at positions corresponding to the window section 8 and the cutter lever 10, an indication on the liquid crystal display 9 provided in the window section 8 may be viewed when the first protector member 15A is mounted and further, the operation of the cutter lever 10 is not interrupted.

When the first protector member 15A and the second protector member 16A are mounted, first, the upper unit 4 and the lower unit 5 are joined together and the grip members 13A, 13B are attached as described previously. Then, the double-sided adhesive tape 59 is attached to an inside face of the first protector member 15A and bonded to the main body 2 such that the protector member 15A frames the window section 8. At that time, the first protector member 15A is positioned by engagement of the third engagement sections 68, 69 with the second engaging sections 50, 54 formed in the grip members 13A, 13B. A fastener 72 is inserted into the hole provided in each of the third engaging sections 68, 69 and tightened. Consequently, the first engaging sections 48, 52, the second engaging sections 50, 54 and the third engaging sections 68, 69 are fixed with the fasteners 72, so that the first protector member 15A is mounted on the tape printing apparatus 1. The grip members 13A, 13B are also fixed to the attachment sections 45, 46 when the fastener 72 is tightened. Thus, the grip members 13A, 13B can be fixed securely to the tape printing apparatus 1 without using any other fasteners. As a result, part of the first protector member 15A covers end sections of the grip members 13A, 13B on the side of the liquid crystal display 9. Thus, disengagement of the grip members 13A, 13B on the side of the liquid crystal display 9 is reduced.

The second protector member 16A is also attached with the double-sided adhesive tape 61 in the same way as described above and the first engaging sections 47, 51, the second engaging sections 49, 53 and the third engaging sections 73, 74 are also fixed when the fasteners 72 are tightened, so that the second protector member 16A is installed on the tape printing apparatus 1. As a result, part of the second protector member 16A covers end sections on opposite sides of the liquid crystal display 9 of the grip members 13A, 13B. Thus, disengagement of the grip members 13A, 13B on the opposite side of the liquid crystal display 9 is reduced.

Next, a method for mounting the first protector member 15B and the second protector member 16B to the tape printing apparatus 1 will be described. First engaging sections 75, 76, 77, 78 each having a hole in the center thereof are formed at four corners of the rear cover 3. Second engaging sections 79, 80, 81, 82 each having a hole in the center thereof are provided at both end sections of the first protector member 15B and the second protector member 16B.

After the double-sided adhesive tape 60 is attached to the inside face of the first protector member 15B, the first protector member 15B is bonded to a corner provided with the second insertion section 42 of the rear cover 3. At this time, the first protector member 15B is positioned when the first engaging sections 75, 76 engages the second engaging sections 79, 80. Then, the first engaging sections 75, 76 are fixed to the second engaging sections 79, 80 when the fasteners 72 are tightened through the holes provided in the second engaging sections 79, 80, so that the first protector member 15B is mounted.

The second protector member 16B is also bonded with the double-sided adhesive tape 62 in the same way as previously described with respect to the first protector member 15B. By tightening the fastener 72, the first engaging sections 77, 78 are fixed to the second engaging sections 81, 82, so that the second protector member 16B is installed on the tape printing apparatus 1.

The first protector members 15A, 15B and the second protector members 16A, 16B are installed to an end section on the side of the liquid crystal display 9 and the other end section on the opposite side of each of the upper unit 4, the lower unit 5 and the rear cover 3. Consequently, the first protector members 15A, 15B only overlap an end of each of the grip members 13A, 13B on the side of the liquid crystal display 9. Thus, when the first protector members 15A, 15B and the second protector members 16A, 16B are installed, sections in which the grip members 13A, 13B are installed are not expanded, thereby easiness of gripping is not hampered.

Figure 10:
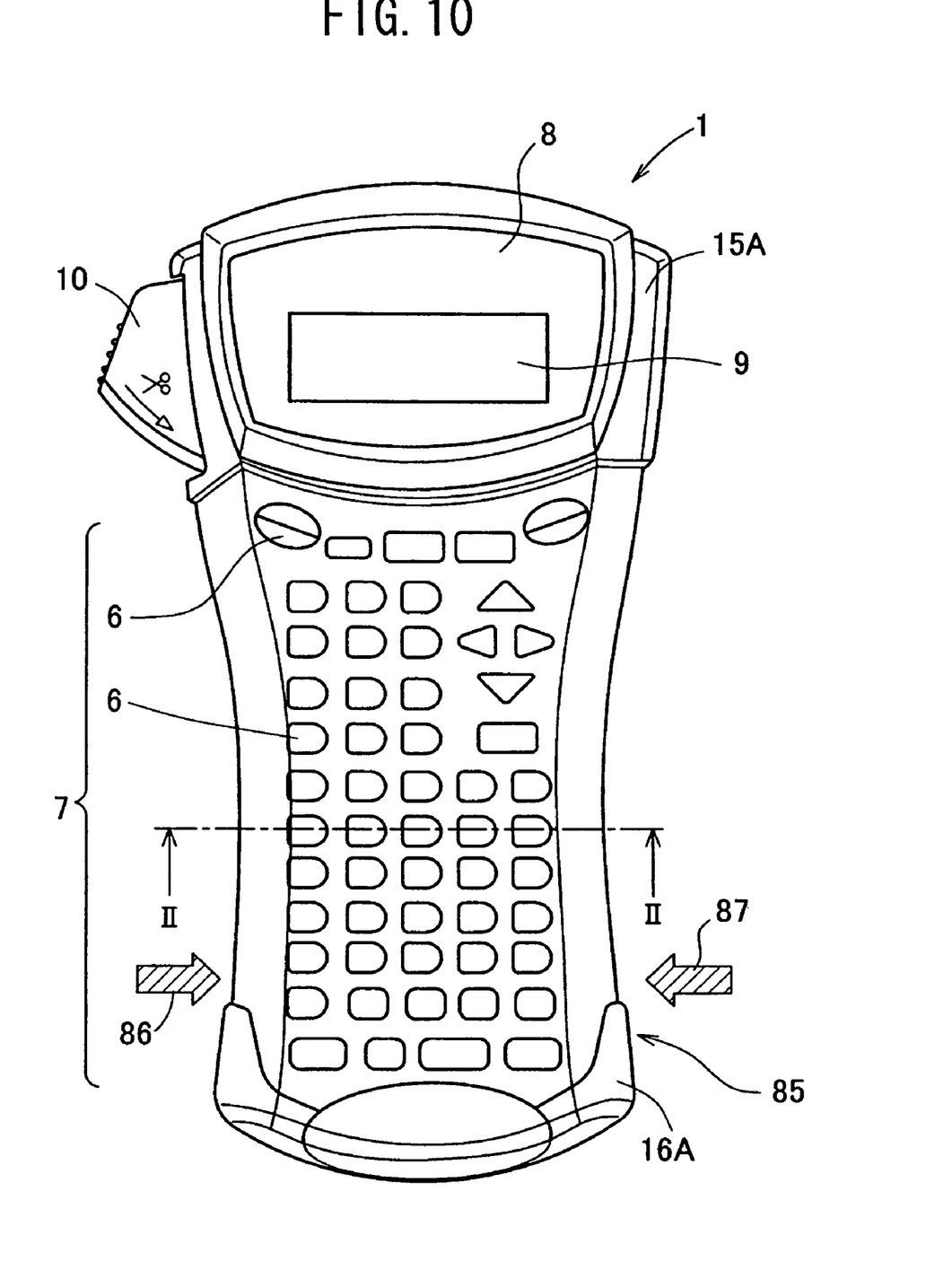
FIG. 10 is a plan view showing the tape printing apparatus of the exemplary embodiment.
Figure 11:
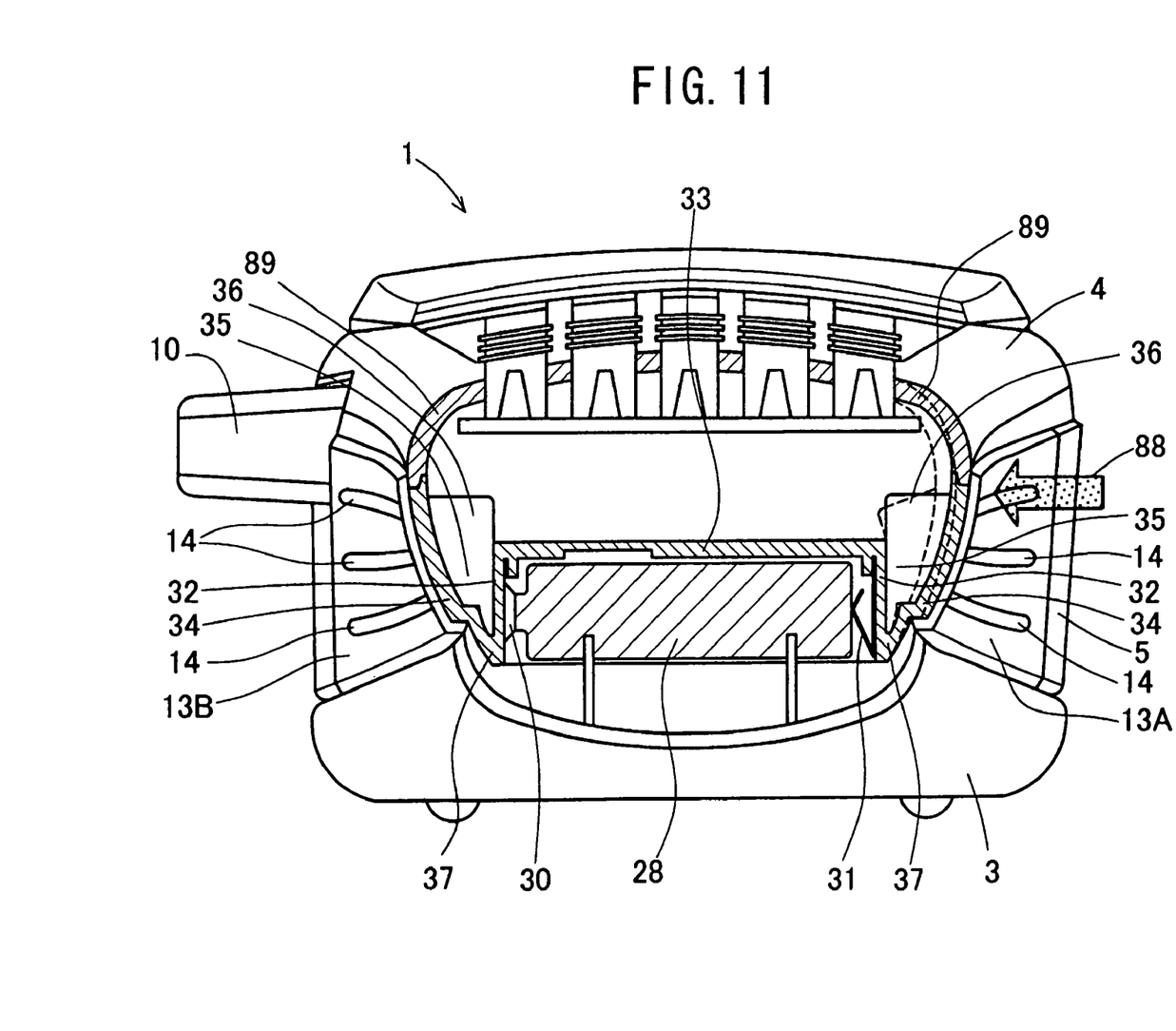
FIG. 11 is a sectional view of the tape printing apparatus taken along the line II—II in FIG. 10.

Next, the mechanism for absorbing an impact of the side wall section 34 will be described in detail with reference to FIGS. 10 and 11. FIG. 10 is a plan view showing a tape printing apparatus 1 of this embodiment. FIG. 11 is a sectional view taken along the line II—II of the tape printing apparatus 1 in FIG. 10.

The tape printing apparatus 1 of this embodiment includes the battery accommodating section 27 which accommodates the batteries 28 therein as described above.

Thus, a lower section 85 (lower section in FIG. 10) of the tape printing apparatus 1 in which the battery accommodating section 27 is disposed is heavier in weight than the other sections. Thus, if the tape printing apparatus 1 is accidentally dropped, usually the lower section 85 hits the ground, floor or other surface first.

At this time, an impact of that drop is absorbed by the second protector members 16A, 16B and the grip members 13A, 13B both formed of any suitable material such as styrene base elastomer resin having elasticity as described above. However, if the tape printing apparatus 1 drops on the ground with the lower section 85 hitting the ground in the traverse direction (directions of arrows 86, 87 in FIG. 10), only having the second protector members 16A, 16B and the grip members 13A, 13B is insufficient to absorb the impact because the negative electrode terminal plate 31 provided on the battery accommodating section 27 is destroyed due to the impact of the drop as will be described.

The negative electrode terminal plate 31 is formed into a substantially V-shaped form by bending a stainless steel plate and when a battery 28 is accommodated, it is pressed by the negative electrode terminal of the battery 28 so that the negative electrode terminal plate 31 is deformed elastically outward (rightward in FIG. 11), thereby respective terminals of the battery 28 make contact with the positive and negative electrode terminal plates 30, 31. Because the negative electrode terminal plate 31 is a thin flexible plate, the strength of the negative electrode terminal plate 31 is lower compared with other members of the tape printing apparatus 1. Thus, if the lower section 85 hits the ground in the traverse direction (directions of the arrows 86, 87 in FIG. 10), the negative electrode terminal plate 31 is pressed strongly by the battery 28 and the accommodating section side wall 32 due to the impact, so that the negative electrode terminal plate 31 is deformed plastically over a tolerable deflection which is allowed in terms of elasticity. Consequently, a distance between the terminal plates 30, 31 becomes larger than the length of the battery 28, so that a contact failure occurs between the negative electrode terminal plate 31 and the battery 28. Further, a section of the negative electrode terminal plate 31 bent into the substantially V-shaped form may be broken.

Thus, in the tape printing apparatus 1 of the exemplary embodiment, in addition to protection provided by the first and second protector members 15A, 15B, 16A, 16B, the gap 35 is formed between the accommodating section side wall 32 which forms the battery accommodating section 27 and the side wall section 34 of the lower unit. As a result, the upper unit 4 and lower unit 5 are deformed flexibly in terms of elasticity, thereby absorbing an impact from outside the tape printing apparatus 1. An exemplary embodiment of an impact absorbing operation will be described using a specific example.

If a strong load is applied to the tape printing apparatus 1 in the direction of an arrow 88 as shown in FIG. 11, the impact of the drop is absorbed by the grip member 13A and, at the same time, the side wall section 34 of the lower unit 5 and the upper side wall section 89 of the upper unit 4 fixed to the lower unit 5 through the first engaging piece 55 of the grip member 13A are deformed toward the inside (direction of the arrow 88 in FIG. 11) of the tape printing apparatus 1.

The ribs 36, which are provided to join the side wall section 34 with the accommodating section side wall 32, has a strength that reduces inward distortion of the side wall section 34 when the tape printing apparatus 1 is held by an operator. If a strong load is applied to the side wall section 34, when the tape printing apparatus 1 is accidentally dropped, the ribs 36 are deformed to reduce an amount of inward distortion of the side wall section 34 towards the curved section 37 as a fulcrum point. As the side wall section 34 is deformed, the upper side wall section 89 fixed to the side wall section 34 is also deformed inward (see FIG. 11). Because the deformation which occurs in the side wall section 34 and the upper side wall section 89 is elastic deformation, when the impact load is released, the side wall section 34 and the upper side wall section 89 are returned to original positions and shapes.

Because the side wall section 34 and the upper side wall section 89 are deformed inward, when a strong impact is applied, the side wall section 34 and the upper side wall section 89 can absorb that impact along with the second protector members 16A, 16B and the grip members 13A, 13B absorb the same impact. Consequently, the tape printing apparatus 1 outer wall and inside devices of the tape printing apparatus 1 are protected from a damage. Further, an impact applied to the battery accommodating section 27 is relaxed in order to reduce a contact failure occurring due to a plastic deformation of the negative electrode terminal plate 31.

In the tape printing apparatus of this embodiment as described above, the first protector members 15A, 15B which cover the upper unit 4, the lower unit 5 and the rear cover 3 that protects the tape printing apparatus 1, the second protector members 16A, 16B located on an opposite side and that covers the other end section of the tape printing apparatus 1 and the grip members 13A, 13B that protect the side sections of the tape printing apparatus 1 are attached between the upper unit 4, the lower unit 5 and the rear cover 3. Additionally, the gap 35 is formed between the battery accommodating section side wall 32 and the side wall section 34, which are formed integrally with a thin plate member. Thus, even if the tape printing apparatus 1 is accidentally dropped, an impact due to the drop is absorbed by the first protector members 15A, 15B, the second protector members 16A, 16B and the grip members 13A, 13B, and the side wall section 34 is deformed inward elastically to further absorb the impact absorption effect. As a result, the tape printing apparatus 1 outer wall and the inside devices of the tape printing apparatus 1 are protected from a damage, an impact applied to the battery accommodating section 27 is reduced and the negative electrode terminal plate 31 is not elastically deformed to reduce a contact failure between the battery 28 and the negative electrode terminal plate 31.

Because the grip members 13A, 13B and the first and second protector members 15A, 15B, 16A and 16B are formed of any suitable material such as styrene base elastomer resin having elasticity, an impact created when the tape printing apparatus 1 drops is reduced and a slippage of the tape printing apparatus 1 is reduced to provide an easy grip for the operator. Further, because the main body 2, the rear cover 3 and double-sided adhesive tape are formed of the same material, mainly any suitable material such as polystyrene and the like, the tape printing apparatus 1 can be recycled even if the grip members 13A, 13B and the second protector members 15A, 15B, 16A and 16B are not removed from the tape printing apparatus 1, thereby enhancing the ability of recycling.

In the tape printing apparatus 1 of the exemplary embodiment, the ribs 36 are provided in the gap 35 located between the side wall section 34 and the accommodating section side wall 32. However, the impact absorbing effect can be increased by providing a tape printing apparatus having no ribs. In this exemplary embodiment, the side wall section 34 is deformed within a range of the gap 35 provided between the side wall section 34 and the accommodating section side wall 32.

Although the grip members 13A, 13B and the first and second protector members 15A, 15B, 16A and 16B are formed of any suitable material such as styrene base elastomer resin, they may be formed of other material having elasticity, for example, silicone rubber or the like.

Although in the tape printing apparatus 1 of this embodiment, the first protector member 15A and the second protector member 16A, which are attached to the upper unit 4 and the lower unit 5, are formed separately, both of them may be formed integrally by combining them. In this case, an opening is formed in a section opposing to the key arrangement section 7 to expose the key arrangement section 7.

Although the first protector member 15B and the second protector member 16B, which are attached to the rear cover 3, are formed separately, both of them may be formed integrally by combining them. In this case, the front face except the check window 44 in the rear cover 3 may be covered by the protector member.

Further, the first protector member 15A and the second protector member 16A may be constructed to be joined together integrally through the grip members 13A, 13B.

Further, shape and size variations of the battery accommodating section 27 appropriately having a gap between the accommodating section side wall 32 and the side wall section 34 may be constructed to accommodate various shaped and/or sized components (not shown) desired to be protected from an impact instead of the battery 28. Thus, the component accommodated in the accommodating section is protected from an impact of the drop due to elastic deformation of the accommodating section side wall 32 and the side wall section 34, the grip members 13A, 13B and the first and second protector members 15A, 15B, 16A and 16B.

As the invention has been described with reference to exemplary embodiments, it is to be understood that the invention is not limited to the exemplary embodiments or constructions. As the various elements of the exemplary embodiments are shown in various combinations and configurations, which are exemplary, other combinations and configurations, including more, less or only a single element, are also within the spirit and scope of the invention.

What is claimed is:

1. An electronic apparatus, comprising:
an outer wall section of the electronic apparatus; and
an inner wall section that is provided inside the outer wall section and includes a battery accommodating section that can accommodate at least one battery, wherein the outer wall section and the inner wall section are thin plate members integrally formed so as to be flexibly deformed under an external force, a specified gap including a substantially v-shaped cross-section is formed between the outer wall section and the inner wall section, and the specified gap is located on both sides of the battery accommodating section.

2. The electronic apparatus according to claim 1, further comprising a protector member that covers the outer wall section.

3. The electronic apparatus according to claim 2, wherein the protector member is formed of elastomer.

4. The electronic apparatus according to claim 1, wherein the battery accommodating section is structured so that a plurality of batteries can be accommodated in the battery accommodating section and can position lengths of the batteries in parallel, and the gap is formed in a length direction of the battery accommodating section.

5. The electronic apparatus according to claim 4, further comprising a protector member that covers the outer wall section.

6. The electronic apparatus according to claim 5, wherein the protector member is formed of elastomer.

7. The electronic apparatus according to claim 1, further comprising a rib, that connects the outer wall section and the inner wall section, formed between the outer wall section and the inner wall section.

8. The electronic apparatus according to claim 7, further comprising a protector member that covers the outer wall section.

9. The electronic apparatus according to claim 8, wherein the protector member is formed of elastomer.

10. The electronic apparatus according to claim 7, wherein the battery accommodating section is structured so that a plurality of batteries can be accommodated in the battery accommodating section and can position lengths of the batteries in parallel, and the gap is formed in a length direction of the battery accommodating section.

11. The electronic apparatus according to claim 10, further comprising a protector member that covers the outer wall section.

12. The electronic apparatus according to claim 11, wherein the protector member is formed of elastomer.

13. The electronic apparatus according to claim 1, further comprising positive and negative electrode plates fixed to the battery accommodating section side walls.

14. An electronic apparatus, comprising:
an outer wall section of the apparatus; and
an inner wall section that is provided inside the outer wall section and includes a component accommodating section that can detachably accommodate at least one component, wherein the outer wall section and the inner wall section are thin plate members integrally formed, a specified gap including a substantially v-shaped cross-section is formed between the outer wall section and the inner wall section, and the specified gap is located on both sides of the component accommodating section.

15. The electronic apparatus according to claim 14, wherein a component accommodating section is structured so that a plurality of components can be accommodated in the component accommodating section and the component accommodating section has at least one holding member that can hold the components detachably by sandwiching the components against the inner wall section in a certain direction, and the gap is formed in the sandwiching direction of the component accommodating section.

16. The electronic apparatus according to claim 15, further comprising a rib, that connects the outer wall section and the inner wall section, formed between the outer wall section and the inner wall section.

17. The electronic apparatus according to claim 14, further comprising a rib, that connects the outer wall section and the inner wall section, formed between the outer wall section and the inner wall section.

18. The electronic apparatus according to claim 14, further comprising holding members which hold the components.

19. An electronic apparatus, comprising:
an outer wall section of the apparatus; and
an inner wall section that is provided inside the outer wall section and includes a component fixing section that can detachably accommodate at least one component, wherein the outer wall section and the inner wall section are thin plate members integrally formed, a specified gap including a substantially v-shaped cross-section is formed between the outer wall section and the inner wall section, and the specified gap is located on both sides of the component fixing section.

20. The electronic apparatus according to claim 19, further comprising a rib, that connects the outer wall section and the inner wall section, formed between the outer wall section and the inner wall section.

21. The electronic apparatus according to claim 19, further comprising members which the components are fixed on.

22. An electronic apparatus, comprising:
a sheath having an outer wall section and an inner wall section, wherein the outer wall section of the sheath is joined to the inner wall section so as to have an elasticity, and the sheath acts as an impact absorbing member that absorbs an impact, created by an external force, by the outer wall section being deformed within a range of a gap including a substantially v-shaped cross-section formed between the outer wall section and the inner wall section.

* * * * *